United States Patent [19]

Gruesbeck, Jr. et al.

[11] 4,046,197
[45] Sept. 6, 1977

[54] WELL COMPLETION AND WORKOVER METHOD

[75] Inventors: Clay Gruesbeck, Jr.; Walter L. Penberthy, Jr.; Thomas W. Muecke, all of Houston, Tex.

[73] Assignee: Exxon Production Research Company, Houston, Tex.

[21] Appl. No.: 682,008

[22] Filed: May 3, 1976

[51] Int. Cl.² .................... E21B 21/00; C09K 7/00
[52] U.S. Cl. ........................ 166/305 R; 166/278; 166/297; 166/312; 175/65; 252/8.5 A
[58] Field of Search ............... 166/259, 276, 277, 278, 166/305 R, 308, 311, 312; 175/65-72; 252/8.5 A, 8.5 B

[56] References Cited

U.S. PATENT DOCUMENTS

| | | | |
|---|---|---|---|
| 1,819,646 | 8/1931 | Loomis et al. | 175/72 |
| 2,352,805 | 7/1944 | Schevermann et al. | 166/311 X |
| 3,378,489 | 4/1968 | Lasater | 166/305 R X |
| 3,633,689 | 1/1972 | Christman | 175/65 |
| 3,675,717 | 7/1972 | Goins, Jr. et al. | 166/278 |
| 3,716,486 | 2/1973 | Perricone | 252/8.5 A X |
| 3,720,265 | 3/1973 | Tate | 166/308 X |

Primary Examiner—Stephen J. Novosad
Assistant Examiner—George A. Suchfield
Attorney, Agent, or Firm—Salvatore J. Casamassima

[57] ABSTRACT

A well completion and workover method wherein a subterranean formation is contacted with a high density, nondamaging treating fluid which comprises a saturated, aqueous solution having finely divided particles of a water soluble salt suspended therein. The saturated aqueous saline solution should have a density of at least about 1.2 g/cc and the suspended salt particles should be present in sufficient quantities to substantially increase the overall density of the treating solution. The preferred fluid comprises a suspension of pulverized sodium chloride in a saturated calcium chloride solution. Dispersants and viscosifiers can be added in minor amounts to help maintain the salt particles in suspension.

11 Claims, 1 Drawing Figure

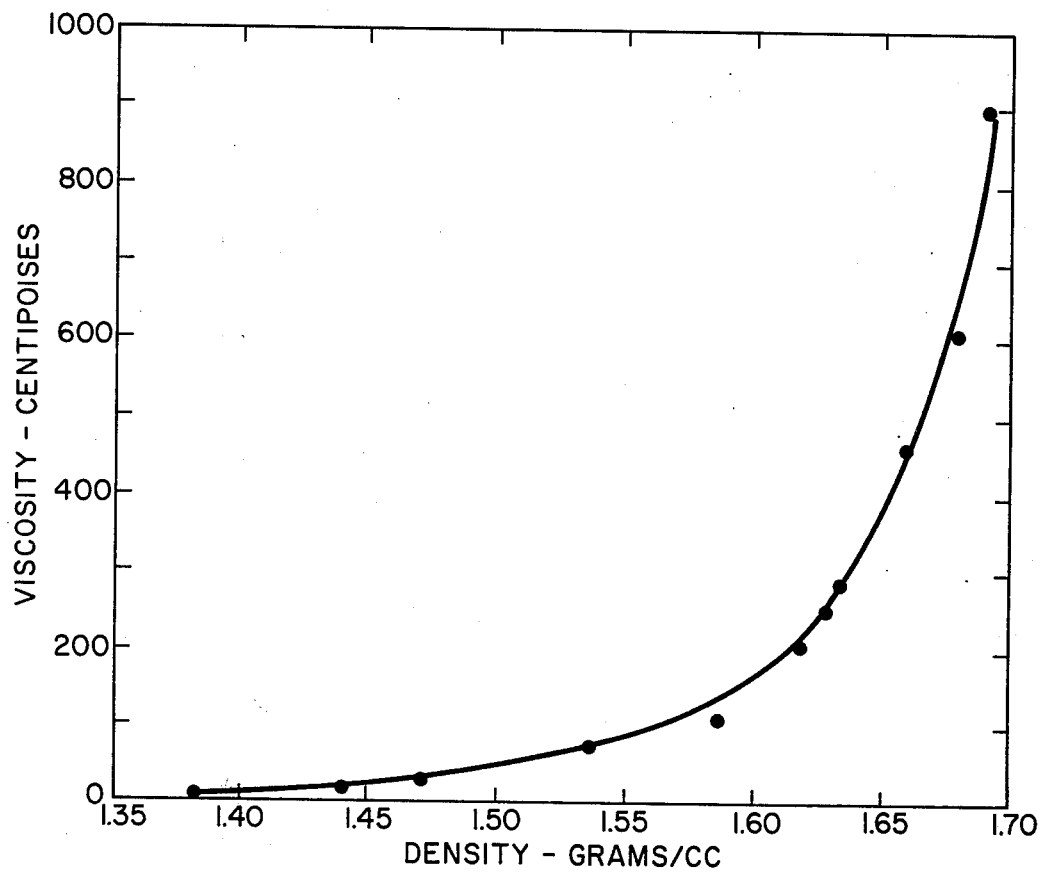

WELL COMPLETION AND WORKOVER METHOD

BACKGROUND OF THE INVENTION

1. Field of the Invention

This invention generally relates to the drilling and servicing of wells in subterranean formations. In one aspect, it relates to contacting subterranean formations with aqueous well completion and workover fluids which are used in the drilling and servicing of wells.

2. Description of the Prior Art

In the drilling of a well into a subterranean formation, it is necessary to cool the drill bit as it cuts into the formation and to remove drill cuttings away from and out of the borehole. A drilling fluid, therefore, is normally circulated downwardly, through the drill pipe, outwardly through nozzles located in the drill bit and upwardly through the wellbore annulus to the surface. Most drilling fluids, commonly referred to as drilling muds, contain suspended particles of hydrated clay in water. Clay based fluids, in addition to cooling the drill bit and transporting cuttings, prevent cave-ins in poorly consolidated wellbores and gas blowouts in high pressure formations. The colloidal properties of the suspended clay, such as high gel strength and high density, contribute significantly to the functions performed by the clay based drilling fluids. A weighting material such as barite is frequently added to the drilling fluid to increase its density so that formation pressures can be contained.

During the well completion phase of the drilling operation, when the drill bit bores through the producing interval, the insoluble materials of the drilling mud, such as clay and barite, cause a filter cake to be laid down on the formation face. Such a filter cake or sheath tends to seal off the formation and may result in a permanent reduction in the permeability of the producing interval. The embedded clay and barite particles can sometimes be removed by acidization. However, even expensive acid treatments are frequently unable to overcome well damage because clay and barite solids have low solubility in acid.

To avoid impairment of permeability, it is necessary to use a "clean" drilling fluid which will not damage the formation but which has sufficient density to contain formation pressures. Similarly, during well servicing and workover operations, such as gravel packing, in which a permeable, production interval will be contacted with a workover fluid, it is also desirable to employ a dense but nondamaging fluid.

Commonly used nondamaging fluids are high density, aqueous saline solutions such as saturated calcium chloride solutions. Although calcium chloride solutions are nondamaging, they possess a maximum density of only 1.38 g/cc (11.5 pounds per gallon) and may not be suitable for all well treatment operations. Mixtures of calcium bromide and calcium chloride solutions can achieve densities as high as 1.81 g/cc (15.1 pounds per gallon), but such mixtures are very costly. Blends of calcium chloride solutions with other high density solutions such as sodium nitrate, calcium nitrate, and zinc chloride have been proposed, but these solutions are highly corrosive and require the addition of expensive inhibitors. In addition, such solutions may be environmentally hazardous.

The addition of insoluble, suspended solids, such as calcium carbonate, can be used to increase the density of aqueous saline solutions, but these solids can invade the formation and can result in the same type of formation permeability damage which is caused by the clay based fluids. Thus, there is a need for a high density, nondamaging well completion and workover fluid.

SUMMARY OF THE INVENTION

The present invention broadly comprises an improved well completion and workover method wherein a subterranean, hydrocarbon-producing formation is contacted with a high density, nondamaging treating fluid. The treating fluid comprises a saturated, aqueous saline solution having a density of at least about 1.2 g/cc (10.0 pounds per gallon) at 10° C (50° F) and having finely divided particles of a water soluble salt suspended therein. The suspended salt particles should be added in sufficient quantities to substantially increase the overall density of the treating fluid.

One such fluid is a suspension of pulverized sodium chloride particles in a saturated solution of calcium chloride. Whereas a solution of calcium chloride has a maximum density of 1.38 g/cc (11.5 pounds per gallon), a suspension of sodium chloride in a saturated calcium chloride solution can be prepared which has a density as high as 1.68 g/cc (14.0 pounds per gallon).

Contacting a formation with the fluids of the present invention will not cause any permanent well damage. Should any of the salt particles, suspended in the fluid, invade and plug the formation, they can be readily dissolved by the flow of produced field brine or by the injection of water or an unsaturated saline solution.

Preferably, the average size of the suspended salt particles should be less than about 10 microns. Pulverized particles of that size are more readily suspended in the aqueous saline solution and will be easily dissolved should they invade the formation. It is also preferable to add chemical agents to the fluids of the present invention to help maintain the finely divided salt particles in suspension. Dispersants and water soluble polymers are especially useful in preventing settling of the salt particles.

BRIEF DESCRIPTION OF THE DRAWING

The drawing is a plot of viscosity versus density for a saturated calcium chloride solution in which there is suspended finely divided particles of sodium chloride.

DESCRIPTION OF THE PREFERRED EMBODIMENTS

The well completion and workover fluids useful for the purposes of the present invention are essentially aqueous slurries comprising suspensions of finely divided particles of a water soluble salt suspended in a saturated aqueous saline solution. Such slurries form high density, nondamaging well completion and workover fluids. Since the aqueous solution is saturated to begin with, the particles of the water soluble salt will remain in suspension almost indefinitely, especially if there are ions which are common to the solution and the suspended salt particles. Thus, a saturated solution of calcium chloride will be unable to dissolve suspended particles of sodium chloride without the concurrent precipitation of calcium chloride. The ionic equilibration, however, will proceed very slowly and the slurry will remain stable for a long period of time.

The suspended salt particles behave as nondamaging weighting agents. Unlike particles of calcium carbonate, clay or barite, the suspended salt particles used in the method of the present invention are water soluble and can be subsequently removed from the formation should the particles become lodged in the formation. Thus, the particles can cause no permanent damage to formation permeability. Field brine, which normally flows from a producing formation, is usually well below the salt saturation level and will dissolve any residual particles of salt remaining in the formation after a well treatment operation. In most instances, the produced field brine will effectively dissolve the residual salt particles it comes in contact with. However, if no brine is produced from the well (as, for example, in a gas well) the water soluble salt particles can be easily removed by spotting the formation with water or unsaturated brine.

Any water soluble salt can be selected as the weighting agent. However, the salt which is highly preferred for the present invention is sodium chloride. Sodium chloride is inexpensive, abundant and very water soluble. Furthermore, it is the major salt component of field brine and sea water and is, therefore, ecologically desirable for both onshore and offshore well completions and workovers.

It is highly preferred to use salt particles that are very finely divided since the finer the particle size, the greater the amount of salt which can be suspended in the saturated solution. Smaller particles are also more readily dissolved should they invade the formation.

Finely divided sodium chloride can be made using conventional pulverization techniques. For example, in jet pulverization, coarse sodium chloride particles are fluidized in a vessel and are impinged with two high velocity jets of air which cause the particles to collide with one another with sufficient impact to promote pulverization of the particles. A product of desired particle size distribution is then withdrawn from above the fluidized zone. Other commercial size reduction processes can also be used to obtain the properly sized comminuted particles. For purposes of the present invention, the pulverized salt particles should have an average size of under about 10 microns and substantially all (99.9%) of the particles should be under 25 microns. As a basis of comparison, ordinary table salt has an average particle size of nearly 200 microns.

The saturated solution component of the fluid of the present invention can be selected from any of the aqueous saline solutions which are commonly used for well completions and workovers. The salt used in the preparation of the solution should have substantial solubility in water so that a density of at least about 1.2 g/cc (10.0 pounds per gallon) can be attained. Saturated solutions of sodium chloride, calcium chloride, potasssium chloride, zinc chloride, calcium bromide, calcium nitrate and sodium nitrate are all possible candidates. However, as previously mentioned, calcium nitrate, sodium nitrate and zinc chloride solutions are avoided where possible because of their corrosive nature and the possible adverse environmental hazards which they pose. The solutions which are usually selected are saturated solutions of calcium chloride, calcium bromide and sodium chloride or mixtures thereof.

Sodium chloride solutions are the least expensive but will yield a maximum density at saturation of only about 1.2 g/cc (10.0 pounds per gallon) at 10° C. This should be the lower density limit of the saturated solutions selected for use in the present invention. The perferred solution for purposes of the present invention is a saturated solution of calcium chloride which has a density of 1.38 g/cc (11.5 pounds per gallon). This solution also offers the advantage of being relatively inexpensive. A saturated calcium bromide solution is very dense but has the disadvantage of having a high freezing point. However, mixtures of calcium bromide and calcium chloride solutions can be formulated with densities as high as 1.91 g/cc (15.1 pounds per gallon) and with freezing points below 20° C (68° F).

As previously mentioned, sodium chloride, being a major component of field brine and sea water, is environmentally safe. Calcium chloride and calcium bromide solutions are also desirable from an environmental standpoint. In addition to being safe to use and handle on land, they are also well suited for use offshore since both calcium chloride and calcium bromide are present in sea water in small quantites. Therefore, accidental spillage of either salt solution into offshore waters will cause no damage. Heavy calcium chloride and calcium bromide brines also exhibit low corrosivity rates and will not significantly damage drilling equipment.

To minimize any corrosivity problems associated with the saline solution component used in the method of the present invention, it is preferable to add small quantities of a corrosion inhibitor to the saline solution. Inhibitors, such as ethylene oxidized organics, act as oxygen scavengers and thereby reduce corrosivity rates. A preferred inhibitor is a water soluble mixture of organic inhibitors which is manufactured by Exxon Chemical under the tradename of Corexit 7720. A concentration of about 5000 parts per million is recommended when the saline solution is utilized as a packer fluid or when it will be left in the wellbore for extended periods of time. A pH of between about 3 and 11 is generally preferred when the well completion or workover fluid is to remain in contact with tubular well equipment.

A preferred well completion and workover fluid for use in the method of the present invention is a combination of the two preferred components, i.e., a saturated solution of calcium chloride having pulverized particles of sodium chloride suspended therein. Such a slurry is inexpensive and can have a density as high as 1.68 g/cc (14.0 pounds per gallon). It is almost totally nondamaging and exhibits a very low corrosivity rate. Another useful fluid is a suspension of particles of sodium chloride in a saturated sodium chloride solution. This fluid has a density as high as 1.5 g/cc (12.5 pounds per gallon) and is very inexpensive, and since the sodium chloride is present in both the saturated solution and the particles, the fluid is in permanent ionic equilibrium. A slightly expensive, but highly dense fluid, can be prepared by suspending sodium chloride particles in a mixture of saturated solutions of calcium chloride and calcium bromide. The density of such a solution can be made as high as 2.1 g/cc (17.5 pounds per gallon).

The suspended salt particles are, therefore, effective weighting agents which, when added in sufficient quantities, significantly increase the density of the treating fluid. For example, effectively suspended sodium chloride particles contribute as much as 0.3 g/cc (2.5 pounds per gallon) to the overall density of the fluid. Naturally, the density increase will depend on the type of water soluble salt selected, the amount of salt used and the suspensive properties of the saturated aqueous solution.

It should be pointed out, however, that adding salt particles to the saturated solution will increase its viscosity as well as its density. The drawing is a plot of viscosity at 511 reciprocal seconds versus density for slurries of sodium chloride suspended in saturated calcium chloride solutions. The drawing shows that viscosity rapidly increases at a density of around 1.60 g/cc for the fluid. The avoidance of pumping difficulties resulting from increased viscosity may, therefore, place an upper limit on the amount of salt particles which can be used. For example, in the preferred solution of sodium chloride particles suspended in saturated calcium chloride, it is probably desirable to maintain density at not more than about 1.60 g/cc (13.3 pounds per gallon).

Altering the rheological properties of the saturated saline solution by adding chemical agents is a preferred technique for increasing the amount of salt which can be suspended in the solution. The addition of dispersants and viscosifiers (such as water soluble polymers) can significantly increase the amount of salt particles which can be maintained in suspension for long or indefinite periods of time.

Dispersants which can be used include sodium salts of alkyl naphthalene sulfonic acid and polymerized carboxylic acid, polyphosphate acid esters and nonylphenyl polyethylene glycol ethers. Generally, any of the commercially sold dispersants which help disperse particles in aqueous media and which prevent preflocculation are suitable for the fluid of the present invention.

Viscosifiers useful in the present invention include synthetic water soluble polymers such as acrylic and vinyl polymers and the cellulose derivatives such as hydroxyethylcellulose and carboxymethylcellulose. Also suitable are the natural gums such as quar gum, gum arabic, gum tragacanth and the microbial fermentation gums such as dextran and xanthomonas gum.

Tests were conducted to determine a preferred suspending agent for the fluids of the present invention. Dispersants and viscosifiers were tested individually and in combination. The most effective product was a combination of xanthomonas gum and Visco 950. Visco 950 is the tradename for a polyphosphate acid ester which is manufactured and sold commercially by Nalco Inc. A weight ratio of 1 part xanthomonas gum to 3 parts Visco 950 was found to be the preferred mixture, but weight ratios of from 1 to 5 to about 1 to 1 will provide adequate suspension. Only minor amounts of the suspending agents need be added to the slurry. For example, 1000 pounds of a saturated calcium chloride solution containing 2 pounds of xanthomonas gum and 6 pounds of Visco 950 would be able to suspend, in a stable slurry, over 450 pounds of sodium chloride to form a fluid having a density of 1.6 g/cc (13.3 pounds per gallon), thereby keeping viscosity at around 200 centipoises.

The nondamaging fluids mentioned above can be used in any number of well treatments where it is necessary to contact the formation with a fluid which will not permanently impair well permeability. For example, in the well completion phase of a drilling operation, the fluids used in the present invention would be substituted for conventional drilling muds.

A suspension of sodium chloride particles in a saturated sodium chloride or calcium chloride solution could be prepared in advance and stored in tanks or drums. If the slurry is stabilized with a dispersant and viscosifier it can be stored almost indefinitely until needed.

When the producing interval is reached, the slurry would be used in the same manner as a drilling mud, i.e., downward circulation through the drill string, outwardly through the drill bit nozzles and upwardly through the wellbore annulus to the surface. The slurry prepared in accordance with the present invention should have sufficient density to provide a hydrostatic head which can contain formation pressures and should be formulated to have such a density.

If the particles of sodium chloride or other soluble salt are, as suggested, very fine (under 25 microns) then the slurry can be passed through conventional mud cleaning equipment to remove drill cuttings. The most thorough mud cleaning equipment available will only separate particles having a size of 50 microns or greater. Therefore, conventional mud cleaning equipment such as shale shakers and desilters will separate most drill cuttings from the fluids of the present invention without the concurrent loss of suspended salt particles, thereby permitting recirculation of the fluid.

Similarly, the fluids used in the present invention can be used for all types of well servicing and workover operations. Dense fluids are frequently needed for such operations because it is necessary to maintain a wellbore pressure of 200 to 300 psi above reservoir pressure. Furthermore, well servicing and workover operations such as gravel packing, well killing, cleaning out, and perforating require very "clean," nondamaging fluids because such operations tend to cause extensive contact of the fluid with the producing zone of the formation. Unless the workover fluid is nondamaging, formation permeability will invariably be impaired. Thus the fluids used in the present invention are ideally suited for such operations.

The principle of the invention and the best mode in which it is contemplated to apply the principle have been described. It is to be understood that the foregoing is illustrative only and that other means and techniques can be employed without departing from the true scope of the invention.

What is claimed is:

1. In a well completion and workover method wherein a subterranean formation is contacted with a treating fluid, the improvement wherein said treating fluid comprises a saturated aqueous saline solution having a density of at least about 1.2 g/cc at 10° C and having finely divided particles of a water soluble salt suspended therein, said particles of salt being present in sufficient quantities to substantially increase the density of said treating fluid, and minor amounts of xanthomonas gum and a polyphosphate acid ester to prevent settling of said salt particles.

2. The well completion and workover method defined in claim 1 wherein said saturated aqueous saline solution is selected from the group consisting of saturated aqueous solutions of sodium chloride, calcium chloride, calcium bromide, calcium nitrate, and zinc chloride and mixtures thereof.

3. The well completion and workover method defined in claim 1 wherein said water soluble salt is sodium chloride.

4. The well completion and workover method defined in claim 1 wherein substantially all of said finely divided salt particles have a particle size of under 25 microns.

5. In a well completion and workover method wherein a subterranean formation is contacted with a treating fluid, the improvment wherein said treating fluid comprises a saturated aqueous solution of calcium chloride having finely divided particles of sodium chloride suspended therein, said particles of sodium chloride being added in sufficient quantities to substantially increase the density of said treating fluid, and minor amounts of xanthomonas gum and a polyphosphate acid ester to prevent settling of said sodium chloride particles.

6. The well completion and workover method defined in claim 5 wherein said xanthomonas gum and said polyphosphate acid ester are in a weight ratio of from about 1 to 5 to about 1 to 1.

7. In a well completion method wherein a drilling fluid is circulated through a drill string and contacted with a subterranean formation, the improvement wherein said drilling fluid comprises a saturated aqueous saline solution having a density of at least about 1.2 g/cc at 10° C and having finely divided particles of a water soluble salt suspended therein, and minor amounts of xanthomonas gum and a polyphosphate acid ester to prevent settling of said salt particles, said drilling fluid having sufficient density to provide a hydrostatic head capable of preventing influx of fluids from said formation.

8. In a workover method wherein a subterranean hydrocarbon bearing formation is contacted with a nondamaging well treatment fluid, the improvement wherein said nondamaging well treatment fluid comprises a saturated aqueous saline solution having a density of at least about 1.2 g/cc at 10° C and having finely divided particles of a water soluble salt suspended therein, and minor amounts of xanthomonas gum and a polyphosphate acid ester to prevent settling of said salt particles, said well treatment fluid having sufficient density to provide a wellbore pressure at least about 100 pounds per square inch above the pressure of said formation.

9. The workover method defined in claim 8 wherein the particles of salt which remain in said formation after the well treatment fluid is withdrawn are removed by contacting said particles with an unsaturated aqueous solution.

10. The workover method defined in claim 9 wherein said unsaturated aqueous solution is field brine produced from said formation.

11. The workover method defined in claim 9 wherein said unsaturated aqueous solution is injected into said formation.

* * * * *